(12) United States Patent
Park et al.

(10) Patent No.: US 7,518,304 B2
(45) Date of Patent: Apr. 14, 2009

(54) FLAT PANEL DISPLAY DEVICE

(75) Inventors: Zin-Min Park, Suwon-si (KR);
Soo-Joung Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 475 days.

(21) Appl. No.: 10/978,214

(22) Filed: Oct. 29, 2004

(65) Prior Publication Data
US 2005/0116611 A1    Jun. 2, 2005

(30) Foreign Application Priority Data
Oct. 31, 2003    (KR) ............... 10-2003-0076965

(51) Int. Cl.
*H01J 63/04* (2006.01)
(52) U.S. Cl. .................... 313/497; 313/309
(58) Field of Classification Search ............. 313/497, 313/495–496, 309
See application file for complete search history.

(56) References Cited

U.S. PATENT DOCUMENTS

| | | | |
|---|---|---|---|
| 4,879,202 A * | 11/1989 | Hosoi et al. ............. 403/139 |
| 5,707,549 A * | 1/1998 | Matsukiyo et al. ..... 252/301.4 R |
| 5,851,428 A * | 12/1998 | Matsuda et al. ....... 252/301.4 R |
| 6,180,029 B1 | 1/2001 | Hampden-Smith et al. |
| 6,344,233 B1 | 2/2002 | Jamil et al. |
| 2001/0013755 A1 * | 8/2001 | Ogawa et al. ............ 313/496 |
| 2003/0027478 A1 * | 2/2003 | Park et al. ................. 445/24 |
| 2003/0044519 A1 * | 3/2003 | Takai .......................... 427/77 |
| 2003/0071560 A1 * | 4/2003 | Komatsu et al. ........... 313/467 |
| 2003/0132699 A1 * | 7/2003 | Yamaguchi et al. ........ 313/496 |

FOREIGN PATENT DOCUMENTS

| JP | 5-159717 | 6/1993 |
|---|---|---|
| JP | 5-251023 | 9/1993 |

(Continued)

OTHER PUBLICATIONS

Oki et al., "A phosphor screen for high-resolution CRTs," Feb. 12, 1995, Journal of the Society for Information Display, vol. 3, Issue, 2, pp. 51-57.*

(Continued)

*Primary Examiner*—Toan Ton
*Assistant Examiner*—Hana A Sanei
(74) *Attorney, Agent, or Firm*—Christie, Parker & Hale, LLP

(57) ABSTRACT

A flat panel display device includes a first substrate; an electron emission region formed on the first substrate; a second substrate located at a predetermined distance facing the first substrate and forming a vacuum vessel with the first substrate; and a light emitting region which emits light derived by electrons emitted from the electron emission source. The light emitting region includes an anode in a predetermined pattern that formed on the second substrate and a phosphor screen layered on the anode. A proportion, k between a screen weight of the phosphor screen and an average diameter of phosphor particles on the phosphor screen satisfies:

$k = S/(D \cdot n)$ where, k ranges from 0.16 to 0.23, S is the screen weight (mg/cm$^2$), D is the average diameter of the phosphor particles, and n is the number of accumulation layers of the phosphor powder particles on the phosphor screen.

21 Claims, 1 Drawing Sheet

FOREIGN PATENT DOCUMENTS

| | | |
|---|---|---|
| JP | 8-045438 | 2/1996 |
| JP | 9-17350 | 1/1997 |
| JP | 10-334838 | 12/1998 |
| JP | 2002-141000 | 5/2002 |
| JP | 2002-298753 | 10/2002 |

OTHER PUBLICATIONS

Patent Abstracts of Japan, Publication No. 05-159717, dated Jun. 25, 1993, in the name of Katsutoshi Ono et al.

Patent Abstracts of Japan, Publication No. 05-251023, dated Sep. 28, 1993, in the name of Kanji Tanaka et al.

Patent Abstracts of Japan, Publication No. 08-045438, dated Feb. 16, 1996, in the name of Sadahisa Yonezawa et al.

Patent Abstracts of Japan, Publication No. 09-017350, dated Jan. 17, 1997, in the name of Ryuji Ozawa.

Patent Abstracts of Japan, Publication No. 10-334838, dated Dec. 18, 1998, in the name of Naohisa Matsuda et al.

Patent Abstracts of Japan, Publication No. 2002-141000, dated May 17, 2002, in the name of Hajime Tanaka et al.

Patent Abstracts of Japan, Publication No. 2002-298753, dated Oct. 11, 2002, in the name of Tomomi Nagase et al.

* cited by examiner

FLAT PANEL DISPLAY DEVICE

CROSS REFERENCE TO RELATED APPLICATION

This application claims priority to and the benefit of Korea Patent Application No. 10-2003-0076965 filed on Oct. 31, 2003 in the Korean Intellectual Property Office, the entire content of which is incorporated herein by reference.

FIELD OF THE INVENTION

The present invention relates to a flat panel display device, and more specifically, to a flat panel display device that has better emission brightness than conventional flat panel display devices.

BACKGROUND OF THE INVENTION

Some flat panel display devices include cathodes and anodes that are respectively aligned on two substrates to provide the display of an image. One type of flat panel display devices is an electron emission device (hereafter referred to as an EED). The EED includes a cold cathode electron emission source on a cathode substrate. The cathode substrate is aligned with an anode substrate on which green, blue and red color phosphor layers have been provided. Emitted electron beams collide with the green, blue and red color phosphor layers to exhibit colors.

A phosphor layer in an EED is in general composed of nonconductive particles, and therefore, there is a high possibility that an electric charge can be accumulated on the surface of the phosphor layer in the emission process of the phosphor layer when the EED is working (or active).

In the conventional EED, it is difficult to get advantageous emission brightness properties because the accumulated electric charge hinders electronic beams from reaching the phosphor layer when the electronic beams are transmitted into the phosphor screen.

U.S. Pat. No. 6,180,029 describes a method of using a phosphor that is spherical, small, and crystalline and has an even particle to improve emission brightness. Another U.S. Pat. No. 6,344,233, describes how to improve the resolution by preventing a phosphor from being contaminated with a phosphor layer made by using a slurry. The entire content in each of the above-cited patents is incorporated herein by reference. However, these methods and/or approaches are far from providing satisfactory results, and more research is still being undertaken to enhance emission brightness.

SUMMARY OF THE INVENTION

In accordance with the present invention, a flat panel display device, which has a phosphor layer with excellent emission brightness, is provided.

An exemplary embodiment of the present invention provides a flat panel display device that includes a first substrate; an electron emitting region formed on the first substrate; a second substrate opposing the first substrate with a predetermined gap therebetween; and a light emitting region. The first and the second substrates form a vacuum assembly. The light emitting region emits light derived by the electrons emitted from the electron emission source and includes an anode and a phosphor screen. The anode is formed on the second substrate with the phosphor screen thereon and a proportion, k between a screen weight of the phosphor screen and an average diameter of phosphor particles on the phosphor screen satisfies:

$$k = S/(D \cdot n) \quad (1)$$

where, k ranges from 0.16 to 0.23 and S is the screen weight $(mg/cm^2)$, D is the average diameter of the phosphor particles, and n is the accumulation number of the phosphor screen.

BRIEF DESCRIPTION OF THE DRAWING

The accompanying drawing(s), together with the specification, illustrate exemplary embodiment(s) of the present invention, and, together with the description, serve to explain the principles of the present invention.

DETAILED DESCRIPTION OF THE INVENTION

Figure 1:
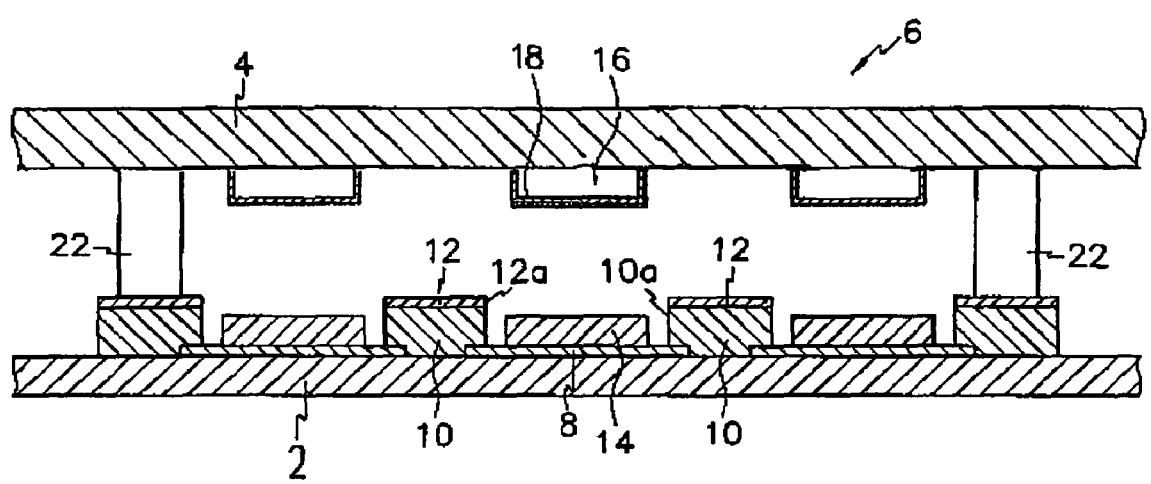
FIG. 1 is a partial cross-sectional view of a flat panel display device.

An embodiment of the present invention is directed to an apparatus and method for enhancing emission brightness of a flat panel display device. The embodiment provides a correlation between phosphor screen weight with respect to diameter of the phosphor powder particles used to form a phosphor screen and a certain brightness.

Specifically, in one embodiment, the screen weight to maximize emission brightness is provided to be directly proportional to the diameter of the phosphor powder particles. In this embodiment, the screen weight indicates the maximum value of emission brightness in proportion to the diameter of phosphor particles in the process of the formation of a phosphor screen. That is, when k represents a proportional constant between the screen weight and the diameter of a phosphor particle, k can be obtained by the following formula (1):

$$k = S/(D \cdot n) \quad (1)$$

where, S is screen weight $(mg/cm^2)$, D is the average diameter of phosphor powder particles, and n is the accumulation number of phosphor screens.

That is, the formula (1) can be simplified as below:

$$k = \text{screen weight/diameter of phosphor powder.}$$

Therefore, an embodiment of the present invention is directed to a flat display device with a phosphor screen embodying a particular value, k, to maximize emission brightness.

In particular, an exemplary flat display device of the present invention includes a first substrate, an electron emission region formed on the first substrate, the second substrate arrayed at a distance from the first substrate to form a vacuum assembly with the first substrate, and a light emitting region for emitting light derived by the electrons emitted from the electron emission region. The light emitting region is composed of an anode that is formed in a pattern on the surface of the second substrate to face the first substrate and a phosphor screen that includes a phosphor layer formed on the anode. The k value of the flat display device in the present invention ranges from about 0.16 to 0.23, and in an exemplary embodiment from about 0.18 to 0.20, to provide the flat display device with an improved emission brightness.

In general, phosphor particles of a phosphor screen formed on the anode of a flat panel display device that is driven by a low or medium voltage should be accumulated at an appropriate thickness having a certain uniformity because it is difficult both for a phosphor to be sufficiently excited at a low or medium voltage and for emitted light to pass through the phosphor screen if the phosphor particles are accumulated to a thickness beyond the appropriate degree. However, if the thickness of the accumulated phosphor particles is less than the appropriate degree, a pinhole could be formed on the screen which fundamentally decreases emission brightness. Therefore, the accumulation thickness of the phosphor critically influences the emission brightness of a flat panel display device.

Typically, between about one (1) or two (2) accumulated layers of phosphor particles (i.e., an accumulation number that ranges from about 1 to 2 or a phosphor screen having about 1 to 2 accumulation layers) should be provided for a flat panel display device that works at a low or medium voltage. Uniformity in the phosphor accumulation is critically important, as it closely relates to the uniformity and quality of a flat panel display device.

In particular, if D is the average diameter of phosphor particles and n is the accumulation number of the phosphor screen, T, the thickness of the phosphor screen, can be addressed in the following formula (2):

$$T = p \times D \times n \qquad (2)$$

where p is a proportional constant that relates to the packing density of the particles.

In addition, if S is the screen weight (mg/cm$^2$), which can also be referred to as the mass of a phosphor screen per a unit area, S can be obtained from the following formula (3), because S is proportional to T (the thickness of the screen).

$$S = p' \times T \qquad (3)$$

where p' is a proportional constant.

Another formula (4) shown below can be deduced from the formulas (1) and (2), and (3) given above.

$$S = pp' \times D \times n \qquad (4)$$

If pp'=k in this formula (4), k can be represented as in the aforementioned mathematical formula (1) as follows;

$$k = S/(D \cdot n) \qquad (1)$$

where S is screen weight (mg/cm$^2$), D is the diameter of phosphor powder particles, and n is the accumulation number of phosphor screens.

The formula (1) shows that k, which indicates maximum emission brightness when the diameter of phosphor particles is given, almost has a constant value regardless of screen weight and the thickness of a screen. Therefore, if a flat panel display device has a k ranging from about 0.16 to 0.23 or from about 0.18 to 0.20 as embodied by an exemplary embodiment of the present invention, it can have excellent emission brightness, regardless of the diameter of phosphor power particles and the thickness of a phosphor screen.

A flat panel display device to embody the present invention will be more specifically illustrated with reference to a partial cross sectional view of an EED shown in FIG. 1. However, a flat panel display device of the present invention is not limited to the EED shown in FIG. 1.

As shown in FIG. 1, the EED mentioned above has first substrate (or cathode substrate) 2 of predetermined dimensions, and second substrate (or anode substrate) 4 of predetermined dimensions. Second substrate 4 is provided substantially in parallel to first substrate 2 with a predetermined gap therebetween. When interconnected, first and the second substrates 2, 4 form vacuum assembly 6 that defines the electron emission display device.

Inside vacuum assembly 6, an electron emitting region being capable of emitting electrons is provided on first substrate 2, and a light emitting region being capable of realizing predetermined images by the electrons emitted from the electron emitting region is provided on second substrate 4. An example of forming the light emitting region is given as follows.

The electron emitting region includes: first substrate 2, cathode 8 formed on first substrate 2, insulating layer 10 formed on cathode 8, gate electrodes 12 formed on insulating layer 10, electron emitting source 14 formed on cathode 8, and gate electrodes 12. Electron emitting source 14 is provided within a hole formed by sides 10a, 12a and penetrating insulating layer 10.

Cathode electrode 8 is initially formed on first substrate 2 in a predetermined pattern, e.g., a stripe pattern, at predetermined intervals, and insulation layer 10 is deposited at a predetermined thickness over an entire surface of first substrate 2 and covering cathode electrode 8.

Gate electrodes 12 with gate electrode hole 12a linked to insulator hole 10a are then formed on insulating layer 10 at predetermined intervals and perpendicularly intersecting cathode electrode 8 in a striped pattern.

Electron emission source 14 is then formed on cathode 8 provided within the hole formed by sides 10a, 12a. Electron emission source 14 can be formed using one or more carbon-based materials selected from carbon nano-tubes, C60 (fullerene), DLC (diamond like carbon), or graphite. Electron emission source 14 can also formed using only carbon-nano tubes.

In accordance with the present invention, the type or the shape of the material or shape of the electronic emission source, of course, is not limited to those shown in FIG. 1. For example, the electron emission source may be formed using molybdenum in a cone shape. In addition, other suitable materials and shapes of electron emission source 14 can also be used.

In operation, the electron emitting region emits electrons from electron emission source 14 according to a distribution of an electric field formed between cathode electrode 8 and gate electrode 12 by applying a voltage between cathode electrode 8 and gate electrode 12 from outside of vacuum assembly 6.

The constitution of the electron emitting region of the present invention, however, is not limited to the embodiment of FIG. 1. Alternatively, the electron emitting region of the present invention may include a gate electrode formed on a first substrate, a cathode substrate, an insulator layer formed on the gate electrode, a cathode electrode formed on the insulator layer, and an electron emission source electrically connected on the cathode electrode.

Referring now back to FIG. 1, the embodiment further includes anode electrode 16 formed on a side of second substrate 4. Anode electrode 16 is aligned with electron emission source 14 and may be made of a transparent material such as indium tin oxide (ITO), or may be made of a metal thin layer, such as aluminum. In addition, phosphor screen (having at least one phosphor layer) 18 is formed at least one side of anode electrode 16 to receive electrons from electron emission source 14 and to emit light derived by the received electrons.

Needless to say, the EED of the present invention is not limited to the structure of FIG. 1. Alternatively, in the case of the metallic layer as the anode electrode, the phosphor screen is formed between the anode electrode and the anode substrate. In addition, the shape of anode electrode is not limited and can be modified into various forms such as a stripe, or a plate shape.

The following examples illustrate the present invention in further detail, but it is understood that the present invention is not limited by these examples.

EXAMPLE 1

A phosphor screen (e.g., phosphor screen 18 of FIG. 1) of a flat panel display device is formed by using ZnS:Ag,Al blue phosphor with a powder particle diameter that is about 4.4 μm.

EXAMPLE 2

A phosphor screen is formed by the same method as in Example 1 except for using a phosphor powder that has a powder particle diameter of about 7 μm.

EXAMPLE 3

A phosphor screen is formed by the same method as in Example 1 except for using the phosphor powder with the diameter of about 9.3 μm.

Table 1 shows k, which indicates a maximum emission brightness, and the thickness of a phosphor screen formed according to Examples 1 to 3.

TABLE 1

| D (Diameter or average diameter of Powder particles) (μm) | S (Weight of Phosphor Screen per the unit area) | T (Thickness of Phosphor Screen)(μm) | n (The number of accumulation layer) | k value |
|---|---|---|---|---|
| 4.4 | 1.244 mg/cm² | 6.2 | 1.5 | 0.187 |
| 7.0 | 2.033 mg/cm² | 9.7 | 1.5 | 0.193 |
| 9.3 | 2.632 mg/cm² | 10.4 | 1.5 | 0.189 |

As is shown in Table 1, k, which indicates a maximum emission brightness, has an almost constant value regardless of the different diameter of phosphor powder particles, and based on this k value, the weight of the phosphor screen per unit area, i.e., the optimal screen weight can be calculated.

Various k values are obtained when a phosphor screen of a flat panel display device is manipulated to have various relative brightness by using ZnS:Ag,Al blue phosphor powders with various different diameters. The results are shown in Tables 2 and 3.

TABLE 2

| D (Diameter of Powder particles) (μm) | S (Weight of Phosphor Screen per the unit area) | Emission Brightness (a.u.) | k value |
|---|---|---|---|
| 4.4 | 1.244 mg/cm² | 138.7 | 0.187 |
| 4.4 | 1.487 mg/cm² | 138.3 | 0.211 |
| 4.4 | 1.667 mg/cm² | 133.7 | 0.223 |
| 4.4 | 1.936 mg/cm² | 123.2 | 0.244 |
| 4.4 | 2.176 mg/cm² | 117.0 | 0.261 |
| 4.4 | 2.477 mg/cm² | 107.2 | 0.282 |

TABLE 3

| D (Diameter of Powder particles) (μm) | S (Weight of Phosphor Screen per the unit area) | Emission Brightness (a.u.) | k value |
|---|---|---|---|
| 7 | 1.447 mg/cm² | 59.4 | 0.159 |
| 7 | 1.743 mg/cm² | 62.8 | 0.178 |
| 7 | 2.033 mg/cm² | 64.0 | 0.193 |
| 7 | 2.225 mg/cm² | 63.1 | 0.199 |
| 7 | 2.565 mg/cm² | 61.7 | 0.216 |
| 7 | 3.490 mg/cm² | 54.0 | 0.277 |

TABLE 4

| D (Diameter of Powder particles) (μm) | S (Weight of Phosphor Screen per the unit area) | Emission Brightness (a.u.) | k value |
|---|---|---|---|
| 9.3 | 1.767 mg/cm² | 755.5 | 0.158 |
| 9.3 | 2.065 mg/cm² | 768.9 | 0.171 |
| 9.3 | 2.284 mg/cm² | 770.8 | 0.176 |
| 9.3 | 2.632 mg/cm² | 773.5 | 0.189 |
| 9.3 | 3.439 mg/cm² | 758.9 | 0.221 |
| 9.3 | 4.787 mg/cm² | 746.3 | 0.303 |

Tables 2 to 4 show the k, which indicates a maximum emission brightness, ranges from about 0.16 to 0.23. As such, the weight of the phosphor screen, that is, the optimal screen weight, can be obtained, and therefore, a flat panel display device with advantageous emission brightness can be made if a phosphor screen with the optimal screen weight is formed.

Consequently, the present invention provides a flat panel display device with advantageous radiation efficiency by calculating an optimal screen weight based on k, the ratio between screen weight and the average diameter of phosphor powder particles.

While this invention has been described in connection with certain exemplary embodiment(s), it is to be understood that the invention is not limited to the disclosed embodiment(s), but, on the contrary, is intended to cover various modifications included within the spirit and scope of the appended claims and equivalents thereof.

What is claimed is:

1. A flat panel display device comprising:
a first substrate;
an electron emission region on the first substrate;
a second substrate facing the first substrate and forming a vacuum vessel with the first substrate; and
a light emitting region for emitting light derived by electrons emitted from the electron emission region and comprising an anode on the second substrate in a pattern and a phosphor screen on at least one side of the anode,
wherein a proportion, k, between a screen weight of the phosphor screen and an average diameter of phosphor particles in the phosphor screen satisfies:

$$k = S/(D \cdot n)$$

where, k ranges from about 0.16 to 0.20 mg/cm²·μm, is the screen weight in mg/cm², D is the average diameter of the phosphor particles in μm, and n is a number of phosphor layers accumulated in the phosphor screen.

2. The flat panel display device according to claim 1, wherein k ranges from about 0.18 to 0.20 mg/cm²·μm.

3. The flat panel display device according to claim 1, wherein n ranges from about 1 to 2.

4. The flat panel display device according to claim 1, wherein the flat panel display device is an emission display device.

5. The flat panel display device according to claim 1, wherein the phosphor particles comprise ZnS:Ag,Al blue phosphor particles.

6. The flat panel display device according to claim 1, wherein S ranges from about 1.2 mg/cm$^2$ to 4.8 mg/cm$^2$.

7. The flat panel display device according to claim 1, wherein S ranges from about 1.2 mg/cm$^2$ to 2.6 mg/cm$^2$.

8. The flat panel display device according to claim 1, wherein the electron emission region comprises a carbon-based material.

9. The flat panel display device according to claim 1, wherein the electron emission region comprises a material selected from the group consisting of a carbon nano-tube material, a fullerene material, a diamond like carbon material, and a graphite material.

10. The flat panel display device according to claim 1, wherein the electron emission region comprises a plurality of carbon nano-tubes.

11. The flat panel display device according to claim 1, wherein the anode comprises a material selected from the group consisting of a transparent material and a metal tin layer material.

12. The flat panel display device according to claim 1, wherein the phosphor screen is between the anode and the electron emission region.

13. The flat panel display device according to claim 1, wherein n is 1.5, and D is one of 4.4, 7.0, or 9.3 µm.

14. An electron emission device of a flat panel display device comprising:
   a cathode having an electron emitting source for emitting a plurality of electrons in a vacuum;
   an anode facing the cathode and for receiving the electrons emitted from the electron emitting source in the vacuum; and
   a phosphor screen for emitting light by receiving the electrons emitted from the electron emitting source in the vacuum,
   wherein the phosphor screen comprises a plurality of phosphor particles,
   wherein a proportion, k, between a screen weight of the phosphor screen and an average diameter of the phosphor particles satisfies:

$k=S/(D \cdot n)$ where, k ranges from about 0.16 to 0.20 mg/cm$^2$·µm, S is a screen weight in mg/cm$^2$, D is the average diameter of the phosphor particles in µm, and n is a number of phosphor layers accumulated in the phosphor screen.

15. The electron emission device of claim 14, wherein k ranges from about 0.18 to 0.20 mg/cm$^2$·µm.

16. The electron emission device according to claim 14, wherein the phosphor screen is between the anode and the cathode.

17. The electron emission device according to claim 14, further comprising:
   a gate electrode,
   wherein the electrons are emitted from the electron emitting source in accordance with a distribution of an electric field between the cathode and the gate electrode.

18. The electron emission device according to claim 17, wherein the phosphor screen is between the anode and the gate electrode.

19. The electron emission device according to claim 14, further comprising:
   a gate electrode between the anode and the cathode.

20. The electron emission device according to claim 19, wherein the phosphor screen is between the anode and the gate electrode.

21. A flat panel display device comprising:
   means for providing a vacuum structure;
   means for emitting a plurality of electrons within the vacuum structure;
   means for receiving the plurality of electrons within the vacuum structure; and
   means for emitting light by receiving the plurality of electrons within the vacuum structure,
   wherein the means for emitting light comprises a phosphor screen comprising a plurality of phosphor particles,
   wherein a proportion, k, between a screen weight of the phosphor screen and an average diameter of the phosphor particles satisfies:

$k=S/(D \cdot n)$ where, k ranges from about 0.16 to 0.20 mg/cm$^2$·µm, S is a screen weight in mg/cm$^2$, D is the average diameter of the phosphor particles in µm, and n is a number of phosphor layers accumulated in the phosphor screen.

* * * * *